US006385915B1

(12) United States Patent
Keeler

(10) Patent No.: US 6,385,915 B1
(45) Date of Patent: May 14, 2002

(54) BIRD-SCARING DEVICE

(76) Inventor: Ted R. Keeler, 1234 E. Chicago Cir., Chandler, AZ (US) 85225

( * ) Notice: Subject to any disclaimer, the term of this patent is extended or adjusted under 35 U.S.C. 154(b) by 0 days.

(21) Appl. No.: 09/780,153

(22) Filed: Feb. 9, 2001

(51) Int. Cl.[7] ............................. A01K 3/00; E04B 1/72; E04H 9/16
(52) U.S. Cl. ..................... 52/101; 119/712; 119/719; 116/22 A; 116/23; 116/DIG. 7; 116/DIG. 8
(58) Field of Search ............................. 52/101; 119/712, 119/719; 116/22 A, 23, DIG. 7, DIG. 8

(56) References Cited

U.S. PATENT DOCUMENTS

| 3,633,560 | A | 1/1972 | De Freitas |
| 4,598,660 | A | 7/1986 | Kouzak |
| 4,805,853 | A | 2/1989 | Battles |
| D303,274 | S | 9/1989 | Stevens |
| 4,973,052 | A | 11/1990 | Conti |
| 5,657,721 | A | 8/1997 | Mayfield et al. |
| 6,161,497 | A | * | 12/2000 | Sallee ...................... 116/28 R |

* cited by examiner

*Primary Examiner*—Carl D. Friedman
*Assistant Examiner*—Chi Nguyen

(57) ABSTRACT

A bird-scaring device for scaring birds without injuring the birds or without using loud noises. The bird-scaring device includes an air dispensing device. An actuator for actuating the air compressor is operationally coupled to the air compressor. A tubular membrane is elongate and has a first end, a second end and peripheral wall extending therebetween. The first end is selectively fluidly coupled to the air dispensing device such that the air dispensing device may inflate the tubular membrane. The peripheral wall of the tubular membrane has a plurality of elongate wires therein. Each of the wires is resiliently flexible. Each of the wires is coiled such that the tubular membrane is in a coiled orientation when it is not inflated. The air compressor forces air into the tubular membrane such that the tubular membrane is selectively inflated into an extended orientation.

3 Claims, 3 Drawing Sheets

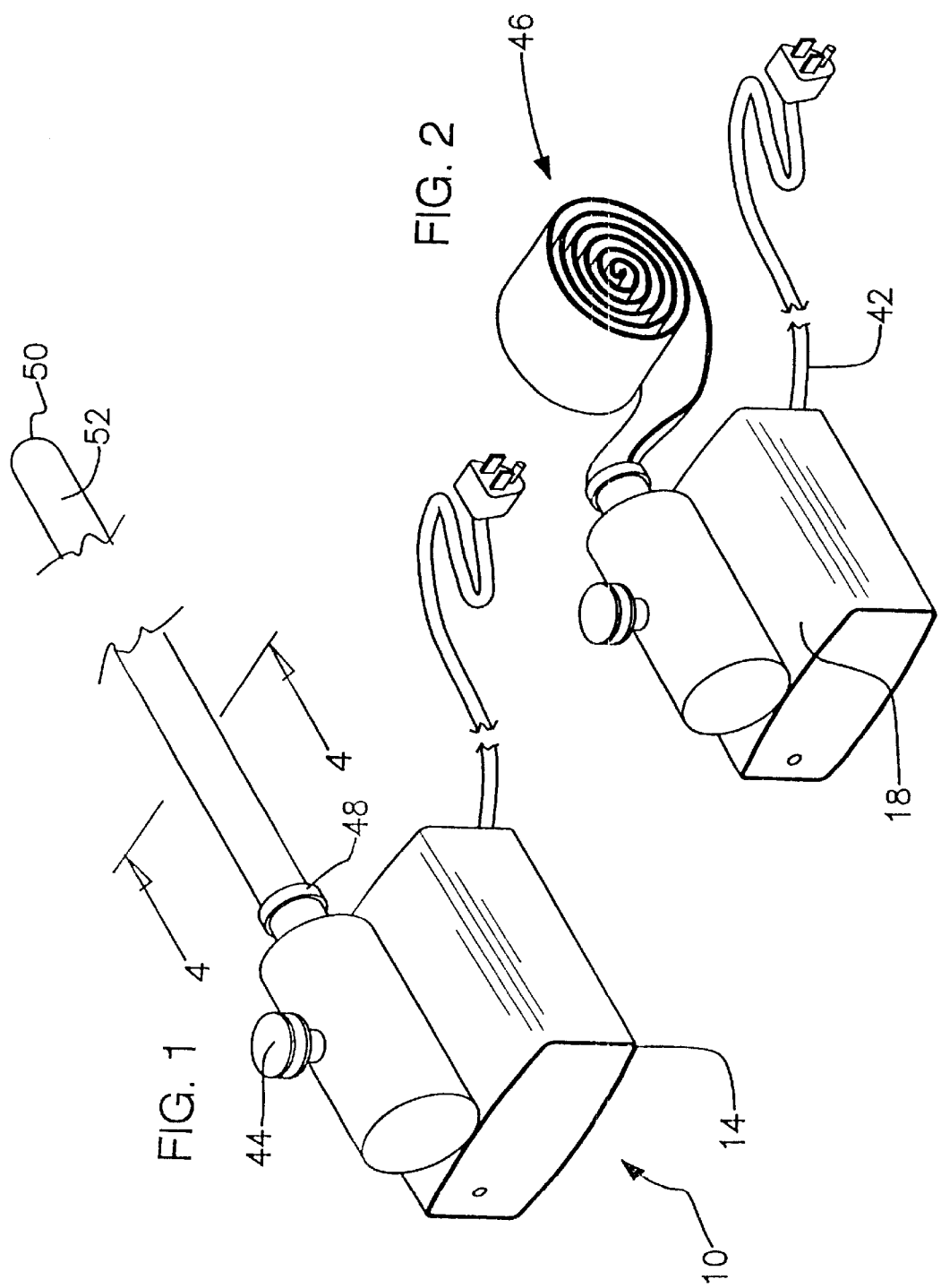

BIRD-SCARING DEVICE

BACKGROUND OF THE INVENTION

1. Field of the Invention

The present invention relates to bird-scaring assemblies and more particularly pertains to a new bird-scaring device for scaring birds without injuring the birds or without using loud noises.

2. Description of the Prior Art

The use of bird-scaring assemblies is known in the prior art. More specifically, bird-scaring assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,633,560; U.S. Pat. No. 5,657,721; U.S. Pat. No. 4,805,853; U.S. Pat. No. 4,598,660; U.S. Pat. No. 4,973,052; and U.S. Des. Pat. No. 303,274.

While these devices fulfill their respective, particular objectives and requirements, the aforementioned patents do not disclose a new bird-scaring device. The inventive device includes an air dispensing device. An actuator for actuating the air compressor is operationally coupled to the air compressor. A tubular membrane is elongate and has a first end, a second end and peripheral wall extending therebetween. The first end is selectively fluidly coupled to the air dispensing device such that the air dispensing device may inflate the tubular membrane. The peripheral wall of the tubular membrane has a plurality of elongate wires therein. Each of the wires is resiliently flexible. Each of the wires is coiled such that the tubular membrane is in a coiled orientation when it is not inflated. The air compressor forces air into the tubular membrane such that the tubular membrane is selectively inflated into an extended orientation.

In these respects, the bird-scaring device according to the present invention substantially departs from the conventional concepts and designs of the prior art, and in so doing provides an apparatus primarily developed for the purpose of scaring birds without injuring the birds or without using loud noises.

SUMMARY OF THE INVENTION

In view of the foregoing disadvantages inherent in the known types of bird-scaring assemblies now present in the prior art, the present invention provides a new bird-scaring device construction wherein the same can be utilized for scaring birds without injuring the birds or without using loud noises.

The general purpose of the present invention, which will be described subsequently in greater detail, is to provide a new bird-scaring device apparatus and method which has many of the advantages of the bird-scaring assemblies mentioned heretofore and many novel features that result in a new bird-scaring device which is not anticipated, rendered obvious, suggested, or even implied by any of the prior art bird-scaring assemblies, either alone or in any combination thereof.

To attain this, the present invention generally comprises an air dispensing device. An actuator for actuating the air compressor is operationally coupled to the air compressor. A tubular membrane is elongate and has a first end, a second end and peripheral wall extending therebetween. The first end is selectively fluidly coupled to the air dispensing device such that the air dispensing device may inflate the tubular membrane. The peripheral wall of the tubular membrane has a plurality of elongate wires therein. Each of the wires is resiliently flexible. Each of the wires is coiled such that the tubular membrane is in a coiled orientation when it is not inflated. The air compressor forces air into the tubular membrane such that the tubular membrane is selectively inflated into an extended orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bird-scaring device apparatus and method which has many of the advantages of the bird-scaring assemblies mentioned heretofore and many novel features that result in a new bird-scaring device which is not anticipated, rendered obvious, suggested, or even implied by any of the prior art bird-scaring assemblies, either alone or in any combination thereof.

It is another object of the present invention to provide a new bird-scaring device which may be easily and efficiently manufactured and marketed.

It is a further object of the present invention to provide a new bird-scaring device which is of a durable and reliable construction.

An even further object of the present invention is to provide a new bird-scaring device which is susceptible of a low cost of manufacture with regard to both materials and labor, and which accordingly is then susceptible of low prices of sale to the consuming public, thereby making such bird-scaring device economically available to the buying public.

Still yet another object of the present invention is to provide a new bird-scaring device which provides in the apparatuses and methods of the prior art some of the advantages thereof, while simultaneously overcoming some of the disadvantages normally associated therewith.

Still another object of the present invention is to provide a new bird-scaring device for scaring birds without injuring the birds or without using loud noises.

Yet another object of the present invention is to provide a new bird-scaring device which includes an air dispensing device. An actuator for actuating the air compressor is operationally coupled to the air compressor. A tubular membrane is elongate and has a first end, a second end and peripheral wall extending therebetween. The first end is selectively fluidly coupled to the air dispensing device such that the air dispensing device may inflate the tubular membrane. The peripheral wall of the tubular membrane has a plurality of elongate wires therein. Each of the wires is resiliently flexible. Each of the wires is coiled such that the tubular membrane is in a coiled orientation when it is not inflated. The air compressor forces air into the tubular membrane such that the tubular membrane is selectively inflated into an extended orientation.

Still yet another object of the present invention is to provide a new bird-scaring device that does not use noise like conventional bird-scaring devices such that the device may be used in residential areas.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new bird-scaring device according to the present invention.

FIG. 2 is a schematic perspective view of the present invention.

DESCRIPTION OF THE PREFERRED EMBODIMENT

Figure 3:
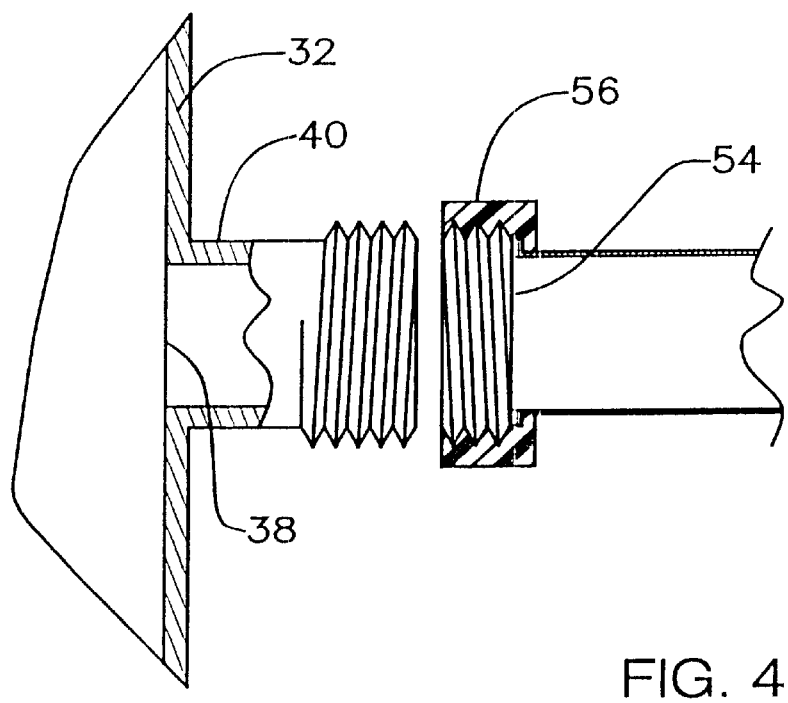
FIG. 3 is a schematic cross-sectional view of the annular lip and annular shoulder of the present invention.
Figure 4:
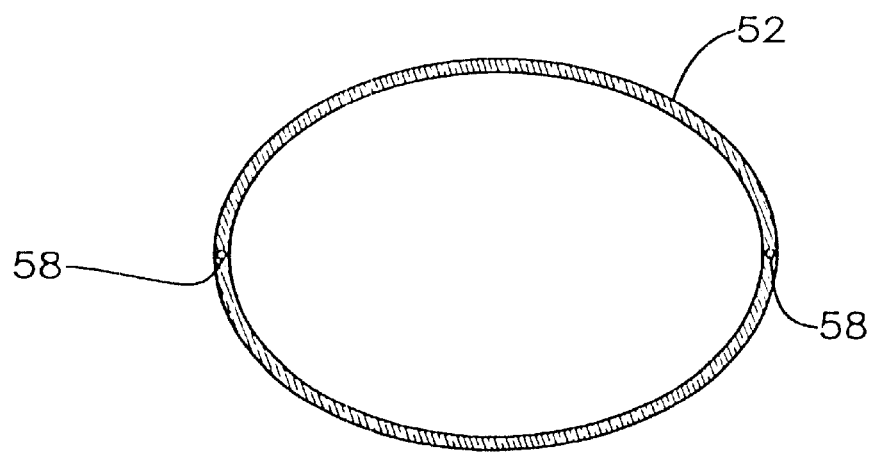
FIG. 4 is a schematic cross-sectional view taken along line 4—4 of the present invention.
Figure 5:
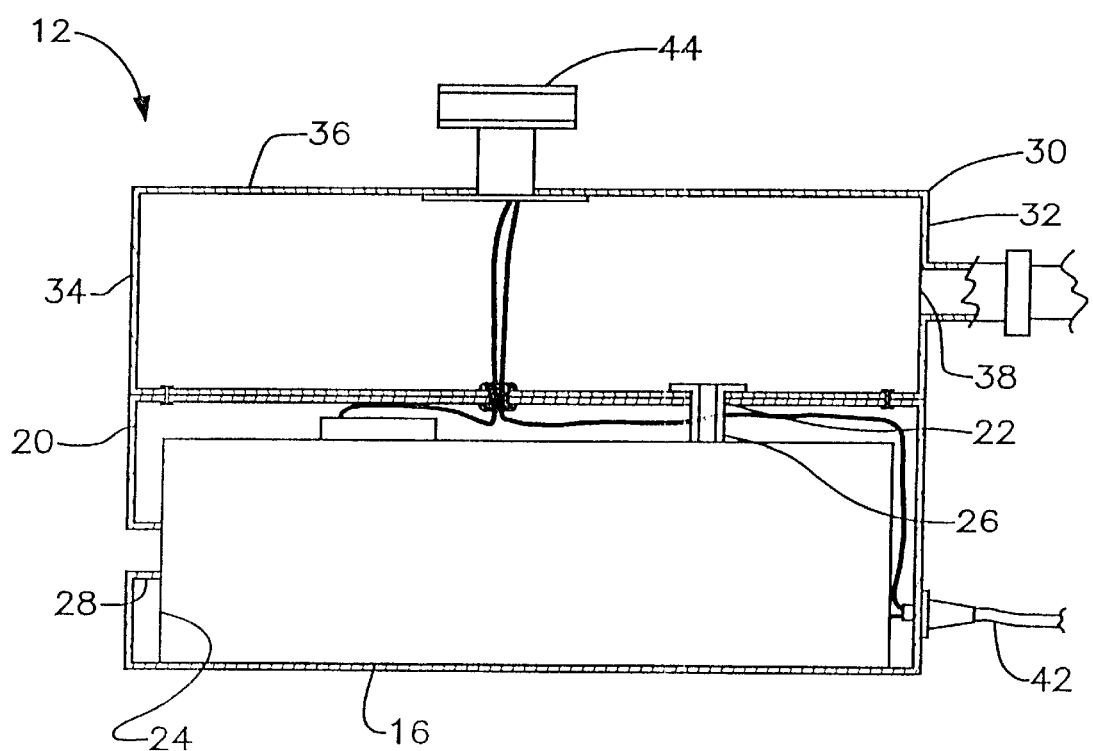
FIG. 5 is a schematic cross-sectional view of the present invention.

With reference now to the drawings, and in particular to FIGS. 1 through 5 thereof, a new bird-scaring device embodying the principles and concepts of the present invention and generally designated by the reference numeral 10 will be described.

As best illustrated in FIGS. 1 through 5, the bird-scaring device 10 generally comprises an air dispensing device 12, the air dispensing device 12 includes a housing 14. The housing 14 has a bottom wall 16, a top wall 18 and a peripheral wall 20 is integrally coupled thereto and extending therebetween. The top wall 18 has an aperture 22 extending therethrough.

An air compressor 24 is positioned in the housing 14. An exit port 26 is fluidly coupled to the air compressor 24 and extends through the aperture 22. An intake port 28 extends through the peripheral wall 20 and is fluidly coupled to the air compressor 24.

A container 30 has a first end wall 32, a second end wall 34, and a perimeter wall 36 is integrally coupled thereto and extends therebetween. The perimeter wall 36 of the container 30 is securely attached to the top wall 18 of the housing 14. The exit port 26 extends into the container 30. The first end wall 32 has a hole 38 extending therethrough. An annular lip 40 is integrally coupled to and extends away from an edge of the hole 38. The annular lip 40 has an outer threaded surface.

A power supply 42 is operationally coupled to the air compressor 24. The power supply 42 preferably comprises a cord extending through the container. A power supply 42 comprised of a battery is also envisioned.

An actuator 44 actuates the air compressor is operationally coupled to the air compressor. The actuator 44 preferably comprises a motion detector. The motion detector is mounted on the perimeter wall 36.

A tubular membrane 46 is elongate and has a first end 48, a second end 50 and peripheral wall 52 extending therebetween. The first end 48 has an opening 54 therein. An annular shoulder 56 is integrally coupled to and extends away from an edge of the opening 54. The annular shoulder 56 has an inner threaded surface adapted for releasably coupling to the annular lip 40. The peripheral wall 52 of the tubular membrane 46 has a plurality of elongate wires 58 therein. Each of the wires 58 generally extends between the first 48 and second 50 ends of the tubular membrane 46. Each of the wires 58 is resiliently flexible. Ideally there are two wires 58 positioned on opposite sides of the tubular membrane 46. Each of the wires 58 is coiled such that the tubular membrane 46 is in a coiled orientation.

In use, the device 10 is positioned on a roof or other areas where a person wants to scare away birds. The motion detector actuates the air compressor 24 when a bird moves near it. The air compressor 24 forces air into the tubular membrane 46 such that the tubular membrane 46 is selectively inflated between a coiled orientation and an extended orientation. As the tubular member 46 uncoils, it scares away nearby birds.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bird scaring device, said device comprising:

an air dispensing device, said air dispensing device comprising;

a housing, said housing having a bottom wall, a top wall and a peripheral wall being integrally coupled thereto and extending therebetween, said top wall having an aperture extending therethrough;

an air compressor, said air compressor being positioned in said housing, an exit port being fluidly coupled to said air compressor and extending through said aperture, an intake port extending through said, peripheral wall and being fluidly coupled to said air compressor;

a container, said container having a first end wall, a second end wall, and a perimeter wall being integrally coupled thereto and extending therebetween, said exit port extending into said container, said first end wall having a hole extending therethrough, an annular lip being integrally coupled to and extending away from an edge of said hole, said annular lip having an outer threaded surface;

a power supply being operationally coupled to said air compressor, said power supply comprising a cord extending through said container;

an actuator for actuating said air compressor, said actuator being operationally coupled to said air compressor, said actuator comprising a motion detector, said motion detector being mounted on said perimeter wall;

a tubular membrane, said tubular membrane being elongate and having a first end, a second end and peripheral wall extending therebetween, said first end having an opening therein, an annular shoulder being integrally coupled to and extending away from an edge of said opening, said annular shoulder having an inner threaded surface adapted for releasably coupling to said annular lip, said peripheral wall of said tubular membrane having a plurality of elongate wires therein, each of said wires being resiliently flexible, each of said wires generally extend between said first and second ends, said plurality of wires preferably comprising two wires positioned on opposite sides of said tubular membrane, each of said wires being coiled such that said tubular membrane is in a coiled orientation; and wherein said air compressor forces air into said tubular membrane such that said tubular membrane is selectively inflated into an extended orientation.

2. The bird scaring device as in claim 1, wherein said air dispensing device comprises:

a housing, said housing having a bottom wall, a top wall and a peripheral wall being integrally coupled thereto and extending therebetween, said top wall having an aperture extending therethrough;

an air compressor, said air compressor being positioned in said housing, an exit port being fluidly coupled to said air compressor and extending through said aperture, an intake port extending through said peripheral wall and being fluidly coupled to said air compressor;

a container, said container having a first end wall, a second end wall, and a perimeter wall being integrally coupled thereto and extending therebetween, said exit port extending into said container, said first end wall having a hole extending therethrough, an annular lip being integrally coupled to and extending away from an edge of said hole, said annular lip having an outer threaded surface;

a power supply being operationally coupled to said air compressor, said power supply comprising a cord extending through said container; and wherein said tubular member is selectively couplable to said annular lip.

3. The bird scaring device as in claim 2, wherein said actuator comprises a motion detector.

* * * * *